3,188,804
**TURBO SUPERCHARGED VALVELESS
PULSE JET ENGINE**
John Alden Mclenric, 409 East Lane, Kerrville, Tex.
Filed Oct. 19, 1962, Ser. No. 231,734
19 Claims. (Cl. 60—35.6)

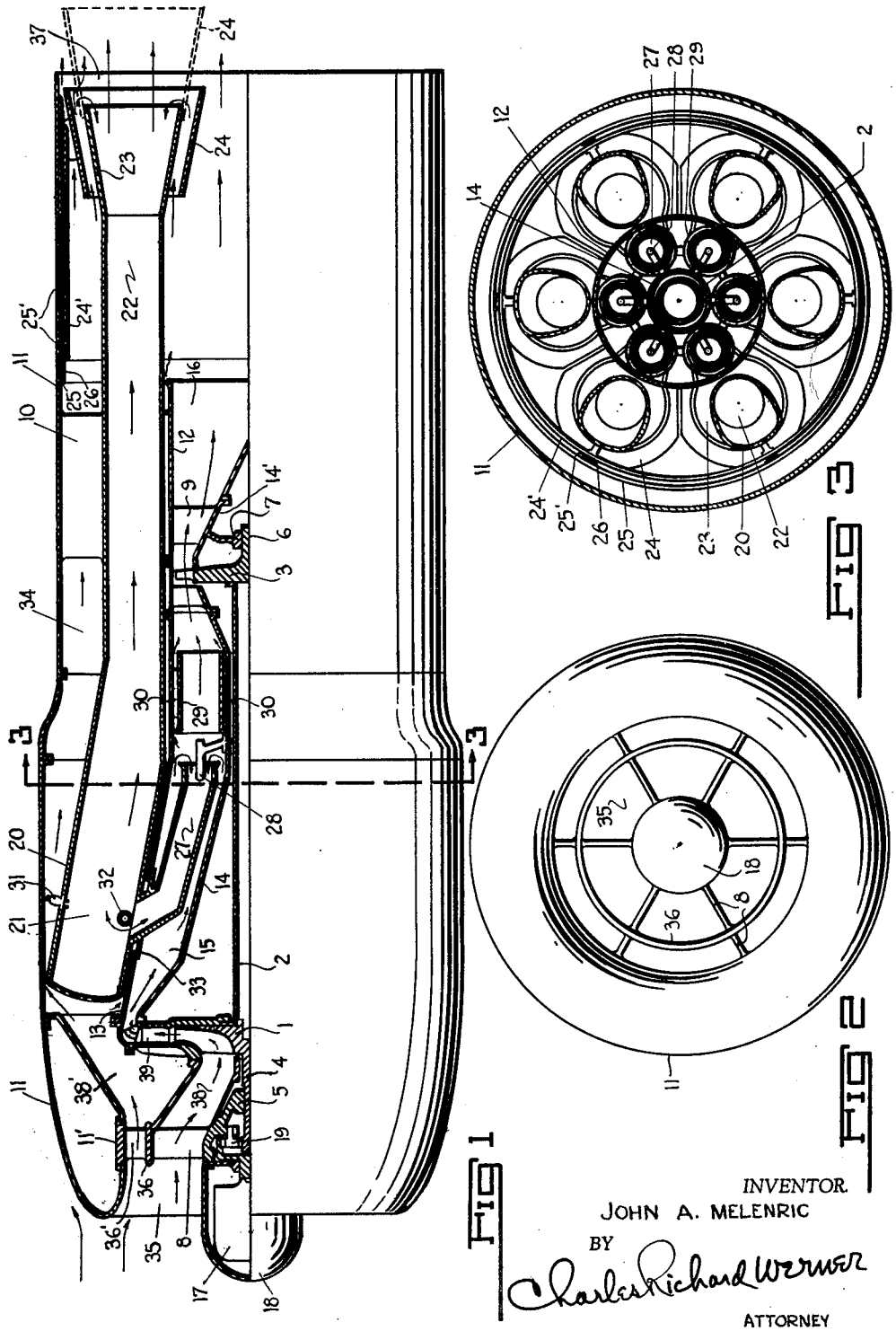

This invention relates in general to power plants and in particular to a turbo-supercharged valveless pulse jet engine which includes an air compressor and turbine system operating independently of but augmenting and being augmented by the operation of one or more valveless pulse jet engines in juxtaposition to the compressor and turbine system, said pulse jet engines primarily discharging directly to the atmosphere and not through the turbine.

It is the principal object of my invention to provide one or more valveless pulse jet engines operating as a primary source of thrust and discharging in an unobstructed flow directly to the atmosphere.

It is another object of my invention to provide an air compressor and turbine system closely related to but independent of the pulse jet engines to supply compressed air thereto, the turbine discharging independently of the pulse jet engines and their exhausts.

It is one more object of my invention to so relate the air inlet of the pulse jet engine to the air supply duct between the air compressor and the turbine whereby on each combustion cycle of a pulse jet engine a portion of the products of combustion will feed into the turbine to augment its operation, and in turn increasing the speed of the compressor and increasing air flow therefrom for both the turbine and the pulse jet engines.

It is a further object of my invention to provide a compact physical arrangement whereby the air compressor and turbine and air supply duct between lie along the central longitudinal axis of the engine surrounded in close proximity by one or more valveless pulse jet engines each having an independent air inlet duct extending into the central air duct between the compressor and turbine.

One more object of my invention is to provide a turbo-supercharged valveless pulse jet engine in which linear aligned compressor, air duct and turbine are surrounded by one or more valveless pulse jet engines receiving air from said air duct, and a streamlined shell surrounding the entire assembly to form a longitudinal air passage through the engine assembly.

Another object of my invention is to provide an air inlet duct to the streamlined shell which will direct high velocity air flow to the compressor with reduced velocity air flow through the longitudinal air passage within the shell.

And still a further object of my invention is to connect the combustion chambers of the pulse jet engines with a common flame tube whereby exhaust gases can travel from one combustion chamber to the next combustion chamber to facilitate restarting an engine without ignition in the event of a flameout.

It is still a further object of my invention to provide a cone-shaped end on the exhaust tube of each pulse jet engine and surrounding said cone-shaped end with an adjustable cone-shaped shield to vary the effective length of the engine and permit more back flow in the exhaust tube.

Other objects and advantages as well as the construction and operation of the engine comprising my invention will be better understood by reference to the following specification in connection with the accompanying drawing in which:

FIG. 1 is a longitudinal view of my engine partially shown in cross section.

FIG. 2 s a front elevational view of the same.

FIG. 3 is a vertical cross section on the line 3—3 of FIG. 1.

Referring now to the drawing by numerals of reference, 1 designates a compressor unit carried by forward end of shaft 2, which is preferably hollow, the rear end of said shaft carrying a turbine unit 3. Forwardly extending hub 4 of compressor unit 1 is rotatably supported in bearing 5, and rearwardly extending hub 6 of the turbine unit is rotatably supported in bearing 7. Bearings 5 and 7 are part of a supporting structure formed of longitudinally positioned air guide vanes 8 in the forward end and air guide vanes 9 and 10 toward the aft end of the engine.

Vanes 8 extend radially to a reinforcing annular ring 11' on which the inner nose portion of the outer shell or cylinder 11 is secured. Vanes 9 extend radially to a cylinder shaped housing 12 having an enlarged frontal portion 13, said housing, in combination with internal annular wall 14, forming a central duct 15 for compressed air as will be hereinafter explained.

The rear end of the cylindrical housing 12 with rear cone-shaped extension 14' of annular wall 14 forms an exhaust duct 16 for the turbine 3, said cone-shaped extension 14' carrying rear bearing 7. Vanes 10 extend radially between the cylindrical housing 12 and the outer shell or cylinder 11.

A suitable starter-generator 17 may be located in the spinner 18 and is driven by suitable gear reduction unit 19 carried on forwardly extending hub 4 of the compressor unit.

One or more valveless pulse jet engines 20 may be clustered about and in close juxtaposition to the compressor-turbine assembly, preferably equidistant from the longitudinal axis of the shaft 2, which is on the longitudinal center line of the assembled power plant.

Each pulse jet engine has a combustion chamber 21 and an exhaust duct 22, the end 23 of the exhaust duct being conically shaped as shown, for the purpose hereinafter specified. A conical shield member 24 with the same taper as that of the conical end 23 is concentrically positioned about the conical end 23 of the exhaust duct of each pulse jet engine. The shield members 24 are mounted on cylindrical support 24' which is sleeved for longitudinal movement in a second cylindrical member 25, rollers 25' being positioned between the cylindrical support 24' and member 25, with suitable longitudinal tracks 26 being provided in the cylindrical members 25 to provide a raceway for the rollers. Any desired means (not shown) may be provided for remote control of the shield members 24 for changing the relationship of said shield members with the conical ends 23 of the exhaust ducts 22 on the pulse jet engines.

An air inlet duct 27 extends from the combustion chamber 21 of each pulse jet engine 20 to the interior of the compressed air duct 15, said duct 27 being in substantially concentric parallel relation to the duct 15 as shown.

A fuel injection nozzle 28 for each pulse jet engine is provided at the inlet end of each air inlet duct 27. Between the fuel injection nozzle and the turbine are positioned augmenter tubes 29, one for each pulse jet engine, said augmenter tubes being supported by air guide vanes 30 secured to the cylindrical housing 12 and to the internal annular wall 14.

Ignition means 31 are positoned in each of the pulse jet engine combustion chambers. A flame tube 32, common to all the pulse jet engines opens to each combustion chamber adjacent the entrance of air inlet duct 27 thereto and will permit hot exhaust gas to travel from one combustion chamber to the next to restart immediately, without ignition, any burner in which a flameout occurs.

A vibration resistant seal 33 may be employed at the junction of the air inlet duct 27 and the cylindrical housing 12 at the enlarged frontal portion 13 of said housing.

Although I have shown my engine with an outer shell or cylinder 11, it is quite possible that this shell could be a part of the wing or fuselage or tail structure of the airplane, the important factor being the provision of a longitudinal air passage 34 for unrestricted cooling airflow past the cylindrical housing 12 with its enlarged frontal section 13 and past each of the pulse jet engines 20 with exhaust ducts 22.

Air entering inlet 35 is divided by ring 36 and flows into passage 38 to the compressor and through passage 36' into expansion chamber 38' for reduced velocity unrestricted low pressure cooling airflow through longitudinal air passage 34 as indicated in the preceding paragraph, the air discharging at exhaust outlet 37 from shell 11.

In the flow from the compressor 1 is a diffuser 39, the compressed air from the diffuser circulating about each pulse jet engine air inlet duct 27, passing through and about the flow augmenter tubes 29, providing cooling air for said augmenter tubes, driving the turbine 3 and discharging from exhaust duct 16. It is to be noted that the end of the exhaust duct 16 is at a point well within the passage 34 so that the flow from the exhaust duct 16 mixes with the air flowing through the passage 34 for discharge from said passage at exhaust outlet 37. The compressor may be of the centrifugal type or the axial flow type which will serve adequately.

In operation, energizing the starter-generator 17 will turn the compressor 1 and turbine 3 on shaft 2 inducing airflow through air inlet 35 and air passage 38 to compressor 1 and diffuser 39 and into the centrally located duct 15. The compressor 1 will build up a slight pressure head and air will flow to low pressure areas through air inlet duct 27 and through the turbine 3.

Fuel supplied by fuel injection nozzle 28 mixes with the air at the inlet of duct 27 and the mixture flows into the combustion chamber 21 of the valveless pulse jet engine 20 to be ignited by ignition means 31.

Upon combustion, high pressure gas is simultaneously discharged from the exhaust duct 22 as well as back through air inlet duct 27 to flow through augmenter tube 29 and mix with compressed air in the vicinity, and passing to and through the turbine, the augmented flow energy increasing the rotational force of the turbine thereby increasing compressor rotation. Exhaust gases from the turbine flow by the air guide vanes 9, out the exhaust duct 16 and toward the exhaust outlet 37 of shell 11.

The same wave phenomena as in unsupercharged valveless pulse jet engines occur in my present form of turbo-supercharged valveless pulse jet engine; that is, the geometry of the burner will control the pulse rate or frequency of combustion of the burner. Not only configuration but fuel-air ratio affects frequency of combustion. If the fuel-air ratio of each burner is exactly the same, combustion in each burner will be in perfect resonance and exactly out of phase with each other. Operating thus, noise and vibration will be minimized, with the engine sound more pleasing to the ear. Experiments have shown that the flame tube tends to help the burners combust in resonance as well as providing means for restarting a burner in which a flameout occurs.

The cone-shaped end 23 of the exhaust tube 22 reduces the pressure of the discharge stream of the products of combustion from each pulse jet engine permitting a back flow and entry of fresh air from passage 34, the air reversing direction at the cones, as is also true of the exhaust from the turbine which combines with the fresh air for reverse flow at the cones.

Aiding the back flow action is the adjustable shield 24 on each pulse jet engine which, in addition to increasing the length of the engine, serves to reduce the velocity of the surrounding discharging air and products of combustion.

The extended position of the shield 24 as shown by dotted lines allows more thrust at the expense of higher fuel consumption and is satisfactory for low airspeeds only, as in takeoffs or landings. Shrouding the exhaust port of tube 22 by moving the shield 24 to full forward position will diminish the effect of high engine velocity operation on the shield's function of aiding in the diversion and back flow into tube 22 of low velocity air and products of combustion externally of the tube 22. The retracted position of the shield 24 is best when the engine has a high forward velocity.

The free flow of cool air through the passage 34 of shell 11 provides for cooler engine operation and surrounds and cools turbine cylinder 12. High pressure cooling air discharging from the compressor flows around the fuel injection nozzle and around the flow augmenter tube 29, past the air guide vanes 20 and out through the turbine where it is available for reverse flow in engine exhaust tubes 22.

The design and position of the air inlet duct 27 are such as to keep air entering said duct at a comparatively low velocity regardless of the forward velocity of the engine. Although the engine could be designed for any desired pressure at the air inlet duct, in the art of compressor design, a pressure ratio of two atmospheres at said duct 27 will give thermal efficiencies comparable to present day turbo jets. With my design based on this pressure ratio it is possible to produce a light and comparatively loose tolerance engine suitable for lower priced light commercial aircraft.

The regular valveless pulse jet engine is limited to lower altitudes as is the internal combustion engine without supercharger. The turbo supercharged valveless pulse jet engine is capable of operating at altitudes comparable to those in which turbo jet engines operate.

Although my engine will operate with only one valveless pulse jet engine cooperating with the compressor and turbine, the design is so flexible that production could be on the basis of producing engines of any desired thrust up to certain maximums for one specific physical size of engine. Other than a few internal structural changes it would be necessary only to cluster the desired number of production valveless pulse jet engines about the compressor turbine assembly.

From the foregoing it will be apparent that I have provided a new and novel turbo-supercharged valveless pulse jet engine, relatively simple in design and low in cost. A compressor-turbine unit is so related to one or more valveless pulse jet engines clustered about said unit and connected to each pulse jet engine through a reverse flow low velocity air inlet duct so that the unit complements the pulse jet engines and vice versa. That is, at one phase of the cycle the compressor-turbine unit is feeding air to the pulse jet engines and at another phase some of the products of combustion feed the turbine to enhance its operation. This buildup continues until a maximum thrust is attained depending also on the air-fuel ratio.

Changes in form, proportion and details of construction may be resorted to without departing from the spirit of my invention and I reserve all rights to such changes as come within the scope of this specification and the claims which follow.

What I claim as new and desire to secure by Letters Patent is:

1. A turbo-supercharged valveless pulse jet engine including
    an air compressor 1 and a turbine 3,
    an air inlet 38 to the air compressor,
    a duct 15 for compressed air between the air compressor and the turbine,
    and an exhaust duct 9 from the turbine, one or more pulse jet engines 20 in juxtaposition to the air compressor and turbine, an air inlet duct 27 to each pulse jet engine from the compressed air duct 15, each pulse jet engine having an exhaust duct 22 independent of the exhaust duct 16 from the turbine, a fuel injection nozzle 28 for each pulse jet engine, and ignition means 31 for each pulse jet engine, the products of combustion from each pulse jet engine discharging from its exhaust duct 22 and simultaneously discharging through its air inlet duct 27 to mix products of combustion with compressed air at the juncture of air inlet duct 27 and duct 15 and to discharge through and increase the efficiency of the turbine.

2. The structure as specified in claim 1, and a vibration resistant seal 33 at the junction of each air inlet duct 27 and the compressed air duct 15.

3. The structure as specified in claim 1, the air inlet duct 27 to each pulse jet engine 20 having an open end terminating in the compressed air duct 15, said open end being directed toward the turbine end and away from the compressor end of the compressed air duct 15, whereby a portion of the products of combustion from the pulse jet engine will exhaust through the air inlet duct 27 and commingle with the compressed air driving the turbine.

4. The structure as specified in claim 1, and a flow augmenter member 29 positioned in the compressed air duct 15 intermediate each pulse jet engine air inlet duct 27 and the turbine 3.

5. The structure as specified in claim 4, each fuel injection nozzle being positioned intermediate the respective flow augmenter member 29 and the air inlet duct 27 to its respective pulse jet engine.

6. The structure as specified in claim 1, and a flame tube 32 common to and opening into all the pulse jet engines.

7. The structure as specified in claim 6, said flame tube 32 connecting with and opening into each pulse jet engine 20 in the vicinity of the junction of the air inlet duct 27 and the pulse jet engine 20.

8. The structure as specified in claim 4, including air guide vanes 30 supporting each flow augmenter tube 29 in the compressed air duct 15 and directing flow through said compressed air duct 15 in a rectilinear direction.

9. The structure as specified in claim 1, including air guide vanes 9 in the exhaust duct 16 from the turbine directing the exhaust therefrom in a rectilinear direction.

10. The structure as specified in claim 1, each pulse jet engine extending rearwardly past the exhaust duct 16 from the turbine 3, the pulse jet engines exhausting at a point rearwardly from the end of the turbine exhaust duct 16.

11. The structure as specified in claim 1, and a conically shaped exhaust shield 24 at the exhaust end of the exhaust duct 22 from each pulse jet engine 20.

12. The structure as specified in claim 1, and an adjustable conically shaped exhaust shield 24 at the exhaust end of the exhaust duct 22 of each pulse jet engine 20 for varying the effective length of said pulse jet engine to provide variable back flow thereto.

13. The structure as specified in claim 1, and an outer shell 11 surrounding the compressor 1, turbine 3, duct 15 for compressed air between the compressor and turbine, and the pulse jet engines 20, said shell providing a longitudinal air passage 34 therethrough, an inlet 35 to the longitudinal air passage, and an exhaust 37 from said longitudinal air passage.

14. The structure as specified in claim 1, including an outer shell 11 surrounding the compressor 1, turbine 3, duct 15 for compressed air between the compressor and the turbine, and the pulse jet engines 20, said shell providing a longitudinal air passage 34 therethrough, an air inlet 36' to the longitudinal air passage independent of the air inlet 38 to the air compressor, and a discharge outlet 37 from the longitudinal air passage, air entering the longitudinal passage 34 passing along the exterior of the compressor, the compressed air passage 15 and the turbine 3, and along the exterior of each pulse jet engine 20 and out the discharge outlet 37 from the longitudinal air passage 34 commingling with discharge from the turbine and the products of combusion from the pulse jet engines.

15. The structure as specified in claim 14, and an expansion chamber 38' at the forward end of the longitudinal air passage for reducing the velocity of the air flow in said longitudinal air passage 34.

16. The structure as specified in claim 14, the exhaust duct 16 from the turbine 3 being within the longitudinal air passage 34 created by the outer shell 11 and terminating forward of the exhaust end of each pulse jet engine, whereby air and products of combustion from the turbine will mix with the air passing through the longitudinal air passage 34 and flow past the exhaust ducts 22 of the pulse jet engines 20, for cyclic reverse flow into said exhaust ducts 22.

17. The structure as specified in claim 14, each pulse jet engine extending rearwardly past the exhaust ducts 16 from the turbine, the pulse jet engines exhausting at a point rearwardly from the end of the turbine exhaust duct 16 and intermediate said turbine exhaust duct 16 and the discharge outlet of the longitudinal air passage.

18. The structure as specified in claim 17, and including a conically shaped adjustable exhaust shield 24 at the exhaust end of the exhaust duct 22 from each pulse jet engine 20, said shield 24, when at one extreme position, providing normal exhaust within the outer shell 11, and when at its other extreme position providing exhaust from the pulse jet engine exhaust ducts 22 beyond the discharge outlet 37 of the longitudinal air passage 34.

19. The structure as specified in claim 18, including shield supporting means 24', 25, 25', 26, carried by the inner wall of the outer shell, and means for longitudinal adjustment of the shield supporting means to adjust all the shields simultaneously.

References Cited by the Examiner

UNITED STATES PATENTS 2,508,396  5/50  Jordan.
2,795,105  6/57  Porter _____ 60—39.77 X
2,934,895  5/60  Gregory et al. _____ 60—35.6
3,001,366  9/61  Shutts _____ 60—39.37 X

FOREIGN PATENTS 62,821  2/55  France.

SAMUEL LEVINE, *Primary Examiner.*

JULIUS E. WEST, *Examiner.*